US012754715B2

(12) United States Patent
Abramovich et al.

(10) Patent No.: US 12,754,715 B2
(45) Date of Patent: Oct. 6, 2026

(54) HARDWARE RANDOM NUMBER GENERATOR

(71) Applicant: ARIEL SCIENTIFIC INNOVATIONS LTD., Ariel (IL)

(72) Inventors: Amir Abramovich, Herzeliya (IL); Natan Kopeika, Beer Sheva (IL); Daniel Rozban, Yehud (IL); Leeroy Solomon, Barkan (IL)

(73) Assignee: ARIEL SCIENTIFIC INNOVATIONS LTD., Ariel (IL)

( * ) Notice: Subject to any disclaimer, the term of this patent is extended or adjusted under 35 U.S.C. 154(b) by 1053 days.

(21) Appl. No.: 17/912,736

(22) PCT Filed: Mar. 18, 2021

(86) PCT No.: PCT/IL2021/050300
§ 371 (c)(1),
(2) Date: Sep. 19, 2022

(87) PCT Pub. No.: WO2021/186446
PCT Pub. Date: Sep. 23, 2021

(65) Prior Publication Data

US 2023/0142915 A1 May 11, 2023

Related U.S. Application Data

(60) Provisional application No. 62/991,630, filed on Mar. 19, 2020.

(51) Int. Cl.
*G06F 7/58* (2006.01)

(52) U.S. Cl.
CPC .................................... *G06F 7/588* (2013.01)

(58) Field of Classification Search
CPC ...................................................... G06F 7/588
See application file for complete search history.

(56) References Cited

U.S. PATENT DOCUMENTS 5,585,694 A 12/1996 Goldburt et al.
6,539,410 B1 3/2003 Klass
(Continued)

FOREIGN PATENT DOCUMENTS

CN 1166772 A 12/1997
JP 2006189946 A 7/2006

OTHER PUBLICATIONS

Anonymous: "Type 1390-B Random-Noise generator—Operating Instructions", General Radio Company, Jan. 1, 1965.
(Continued)

*Primary Examiner* — Michael D. Yaary
(74) *Attorney, Agent, or Firm* — The Roy Gross Law Firm, LLC; Roy D. Gross

(57) ABSTRACT

Disclosed is a method for generating a series of random numbers, comprising: operating a circuit comprising a low-pressure cold-cathode glow discharge lamp; and converting an analog current-noise signal in the circuit caused as a result of the operating to a digital data signal, wherein the digital data signal constitutes a series of random numbers. Also disclosed is a hardware random number generator circuit that generates, from noise caused by the operation of a low-pressure cold-cathode glow discharge lamp, a digital data signal that constitutes a series of random numbers.

18 Claims, 9 Drawing Sheets

(56) References Cited

U.S. PATENT DOCUMENTS

| | | | | |
|---|---|---|---|---|
| 6,542,014 | B1 * | 4/2003 | Saito | G06F 7/588 331/78 |
| 7,284,024 | B1 | 10/2007 | Trifonov et al. | |
| 7,401,108 | B2 | 7/2008 | Miller, Jr. | |
| 9,722,820 | B1 | 8/2017 | Hekmat et al. | |
| 9,747,077 | B2 | 8/2017 | Sanguinetti et al. | |
| 10,067,745 | B2 | 9/2018 | Sussman et al. | |
| 10,430,159 | B1 | 10/2019 | Crosier | |
| 2008/0143258 | A1 | 6/2008 | Yamashita et al. | |
| 2009/0177725 | A1 | 7/2009 | Ikegami et al. | |

OTHER PUBLICATIONS

Maher et al., "Random Number Generator Founded on Signal and Information Theory", Cryptographic Hardware and Embedded Systems. 1st International Workshop, Ches'99. Worcester, MA, Aug. 12-13, 1999, Proceedings; [Lecture Notes in Computer Science], Berlin; Springer, DE, vol. 1717, Aug. 12, 1999, pp. 219-230. DOI: 10.1007/3-540-48059-5_19.

A V Phelps and Z Lj Petrovic. Cold-cathode discharges and breakdown in argon: surface and gas phase production of secondary electrons. 1999 Plasma Sources Sci. Technol. 8 R21 DOI 10.1088/0963-0252/8/3/201.

Andrea Espinel Rojas, Anis Allagui, Ahmed S. Elwakil, Hussain Alawadhi; True random bit generators based on current time series of contact glow discharge electrolysis. Journal of Applied Physics May 28, 2018; 123 (20): 203301. https://doi.org/10.1063/1.5025795.

PCT International Search Report for International Application No. PCT/IL2021/050300, mailed Jul. 15, 2021, 5pp.

PCT Written Opinion for International Application No. PCT/IL2021/050300, mailed Jul. 15, 2021, 5pp.

PCT International Preliminary Report on Patentability for International Application No. PCT/IL2021/050300, issued Sep. 20, 2022, 6pp.

* cited by examiner

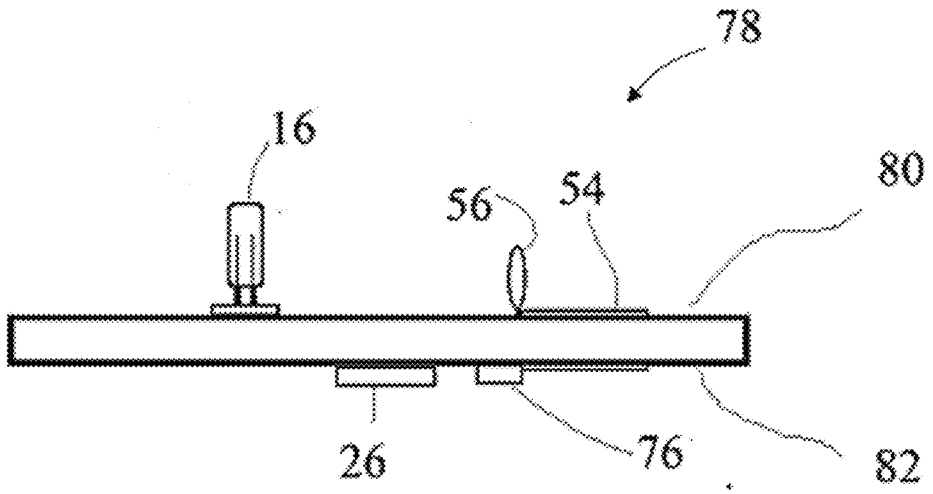
FIG. 2 ~36
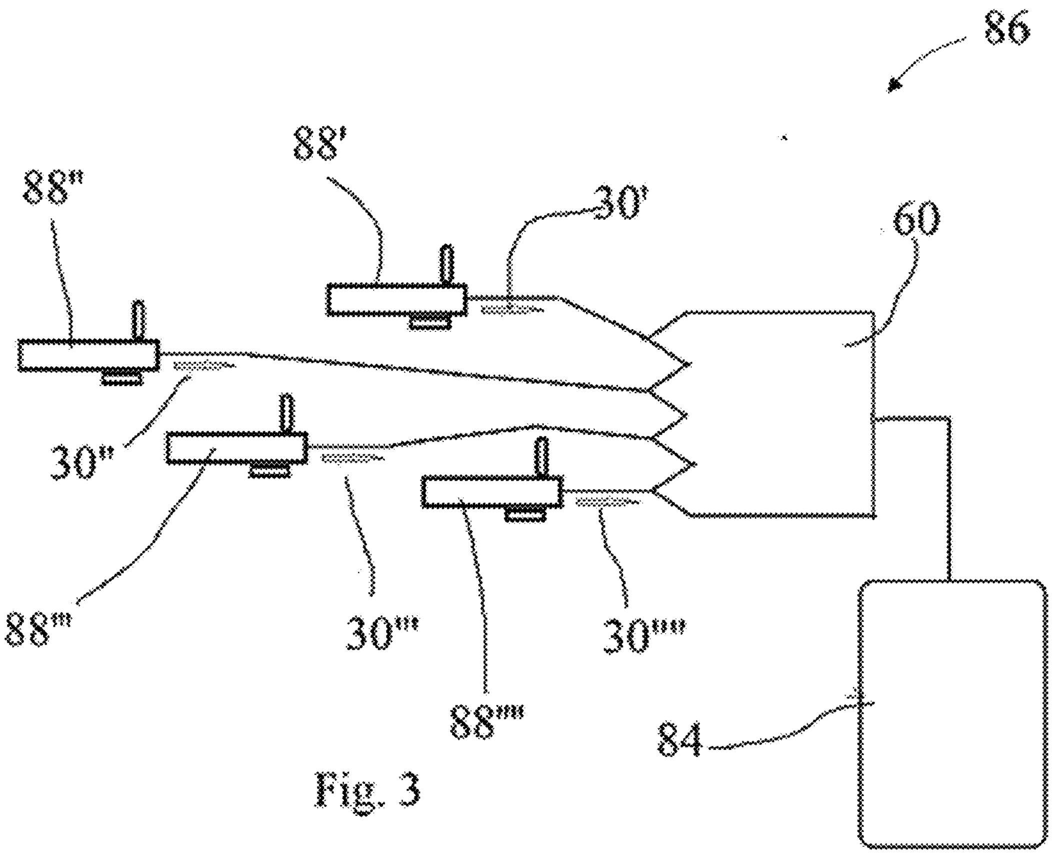
Fig. 3

HARDWARE RANDOM NUMBER GENERATOR

CROSS-REFERENCE TO RELATED APPLICATION

This application is a National Phase of PCT Patent Application No. PCT/IL2021/050300 having International filing date of Mar. 18, 2021, which claims the benefit of U.S. Provisional Application Ser. No. 62/991,630, filed Mar. 19, 2020, the contents of which are all incorporated by reference herein in their entirety.

FIELD AND BACKGROUND OF THE INVENTION

The invention, in some embodiments, relates to the field of computing and network communication and more particularly, but not exclusively, to a hardware random number generator circuit that generates, from noise caused by the operation of a low-pressure cold-cathode glow discharge lamp, a digital data signal that constitutes a series of random numbers.

In the field of computing there are many uses for random numbers including in gaming, gambling, authentication, computer algorithms, computer simulations and cryptography.

For example, in the field of computing and network communications, data is encrypted using an encryption key to prevent unauthorized use of the data. In such implementations, the encryption key is typically a number extracted from a series of numbers generated by a Hardware Random Number Generator (HRNG) or by a Pseudo-Random Number Generator (PRNG).

PRNGs are usually programs (hardware, firmware or software) that generate a series of numbers starting from a seed, the seed being the argument number provided to the PRNG as a starting value. The series of numbers generated by a PRNG approximates a series of random numbers but is not truly random as the series is completely determined by the seed.

Series of true random numbers (or almost true random numbers) are typically generated using hardware random number generators (HRNGs), which are based on random physical process, that output a series of numbers derived from this physical process. Some such processes include atmospheric noise, cosmic background radiation, radioactive decay, thermal noise and a device based on Young's 1801 experiment using a single photon source, a beam splitter and a photon detector.

Challenges in implementing HRNGs include finding a phenomenon in which noise signal (intensity of noise as a function of time) can be monitored to provide a random series that has a sufficiently high bit rate (e.g., tossing coins and rolling dice are considered too slow for many applications), that is sufficiently intense, that is stable and does not degrade over time, has a sufficient bandwidth, is not periodic and is independent of external variables (e.g., ambient temperature, power supply characteristics). Further, it is often challenging to find hardware that measures noise accompanying a given phenomenon and that generates a random series therefrom that is inexpensive, reliable, simple rather than complex, compact rather than large, requires little energy, does not require particular environmental conditions, does not require substantial maintenance and that does not cause the loss of randomness as a result of the monitoring and generating, for example, there is some inherent loss of randomness due to the hardware or some systematic measurement bias of the detection hardware.

Random noise generators for use in HRNGs have been described, for example, in U.S. Pat. No. 6,539,410 to Michael Jay Klass, U.S. Pat. No. 7,284,024 to MagiQ Technologies Inc. (New York, N.Y., USA), U.S. Pat. No. 7,401,108 to Avago Technologies Ltd. (Singapore), U.S. Pat. No. 9,747,077 to Université de Genéve (Genéve, Switzerland), U.S. Pat. No. 9,722,820 to ID Quantique (Genéve, Switzerland) and U.S. Pat. No. 10,067,745 to National Research Council of Canada (Ottawa, ON, Canada).

It is desirable to have a useful hardware random number generator, having one or more advantages over HRNGs known in the art, such as small dimension, cheap circuitry, and operative in very high rates, as high as tenths of Gbps and robust against environmental extreme conditions.

SUMMARY OF THE INVENTION

The invention, in some embodiments, relates to the field of computing and network communication and more particularly, but not exclusively, to methods for generating a series of random numbers and to a hardware random number generator circuit that generates, from noise caused by the operation of a low-pressure cold-cathode glow discharge lamp, a digital data signal that constitutes a series of random numbers.

According to an aspect of some embodiments of the invention, there is provided a method for generating a series of random numbers, comprising:

- operating a circuit comprising a low-pressure cold-cathode glow discharge lamp; and
- converting an analog current-noise signal in the circuit caused as a result of the operating to a digital data signal, wherein the digital data signal constitutes a series of random numbers.

According to an aspect of some embodiments of the invention, there is also provided a random number generator circuit, comprising:

- a. a low-pressure cold-cathode glow discharge lamp, having:
  - a first lamp electrode, and
  - a second lamp electrode;
- b. a first line for providing electrical connection between the first lamp electrode and a first electrode of an electrical power supply;
- c. a second line for providing electrical connection between the second lamp electrode and a second electrode of an electrical power supply; and
- d. electrically connected to a line selected from the group consisting of the first line and the second line, a transimpedance unit configured to:
  - receive from the selected line an analog current-noise signal caused as a result of the operation of the glow discharge lamp, and
  - to generate and output an analog voltage signal that is representative of the variation of the received analog current-noise signal.

According to an aspect of some embodiments of the invention, there is also provided a PCB comprising a random number generator circuit according to the teachings herein.

According to an aspect of some embodiments of the invention, there is also provided a computing device comprising: a random number generator circuit according to the teachings herein for generating and outputting a digital data signal that constitutes a series of random numbers; and a computer processor configured to receive the digital voltage signal.

According to an aspect of some embodiments of the invention, there is also provided a device comprising: a random number generator circuit according to the teachings herein for generating and outputting a digital data signal that constitutes a series of random numbers; and a digital storage module configured to store values of the digital voltage signal as random numbers.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIG. 2 schematically depicts a PCB bearing an embodiment of random number generator circuit according to the teachings herein;

FIG. 3 schematically depicts four individual random number generator circuits according to the teachings herein functionally associated with a multichannel ADC;

DESCRIPTION OF SOME EMBODIMENTS OF THE INVENTION

Figure 1A:
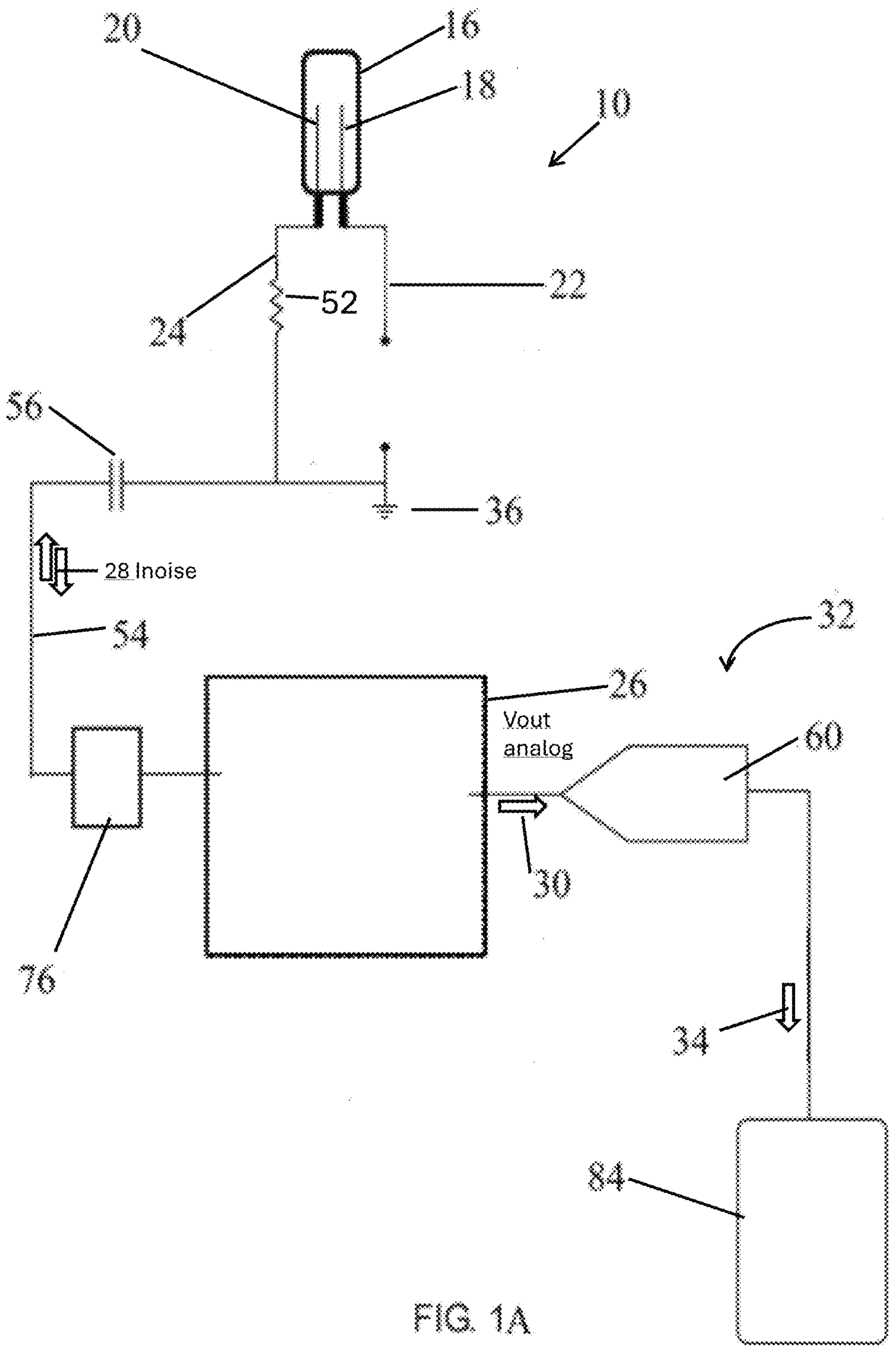
FIGS. 1A, 1B and 1C each schematically depict a different exemplary embodiment of a random number generator circuit according to the teachings herein.

The invention, in some embodiments, relates to the field of computing and network communication and more particularly, but not exclusively, to methods for generating a series of random numbers and a hardware random number generator circuit that generates, from noise caused by the operation of a low-pressure cold-cathode glow discharge lamp, a digital data signal that constitutes series of random numbers.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As discussed in the introduction, known hardware random number generators (HRNGs) output a series of random numbers based on the measurement of a noise signal (intensity of the noise as a function of time) accompanying some physical phenomenon. Challenges in implementing such HRNGs include but are not limited to finding a phenomenon that generates noise with a sufficiently high bit rate, sufficient intensity, independence of the noise on external variables, practical noise-detection hardware, as well as practically avoiding measuring non-random noise of the phenomenon, of the hardware and avoiding any systematic measurement bias of the detection hardware.

Herein is disclosed a hardware random number generator circuit that generates a series of random numbers by converting the current-noise signal produced by a low-pressure cold-cathode glow discharge lamp during operation thereof to a digital data signal that constitutes a series of random numbers. The disclosed circuit and devices including the circuit overcome some, many and even all of the challenges in implementing a HRNG. Low-pressure cold-cathode glow discharge lamps are very cheap, small, operable at a wide range of temperatures including room-temperature, do not require heating or cooling, have very low current (0.1-10 mA) and power requirements for operation and have extremely long lifetimes (typically 50,000 hours of continuous operation). Further, as discussed in the description below the hardware to convert the current-noise signal noise to a digital data signal that constitutes a series of random numbers is simple, cheap, and compact. Further, although glow discharge lamps require high voltage to operate (~100 V), the Inventors disclose detection hardware that provides a digital data signal that constitutes a series of random numbers at low voltages that are compatible with common computing hardware that operate at low voltages (<10 V).

Thus, according to an aspect of some embodiments of the teachings herein, there is provided a method for generating a series of random numbers, comprising:

- operating a circuit comprising a low-pressure cold-cathode glow discharge lamp; and
- converting an analog current-noise signal in the circuit caused as a result of the operating to a digital data signal,
- wherein the digital data signal constitutes a series of random numbers.

In some embodiments of the method, converting the analog current-noise signal to a digital data signal comprises:

- converting the analog current-noise signal to an analog voltage signal that is representative of the variation of the analog current-noise signal; and
- digitizing the analog voltage signal, thereby generating the digital data signal.

In some embodiments, converting the analog current-noise signal to an analog voltage signal is performed using a transimpedance unit configured to receive the analog current-noise signal and to generate and output an analog voltage signal that is representative of the variation of the received analog current-noise signal.

In some embodiments of the method, the glow discharge lamp is operated at a voltage of greater than 60 V and the transimpedance unit is operated at a voltage of not more than about 12 V.

In some embodiments of the method, the digitizing is performed with a digitizer that is configured to receive the analog voltage signal and to generate and output a digital data signal that is representative of the variation of the analog current-noise signal. In some such embodiments, the digitizer is selected from the group consisting of an Analog-to-Digital Converter and a comparator.

In some embodiments of the method, the digital data signal has a data rate of not less than 1 Gigasample/s.

Figure 1B:
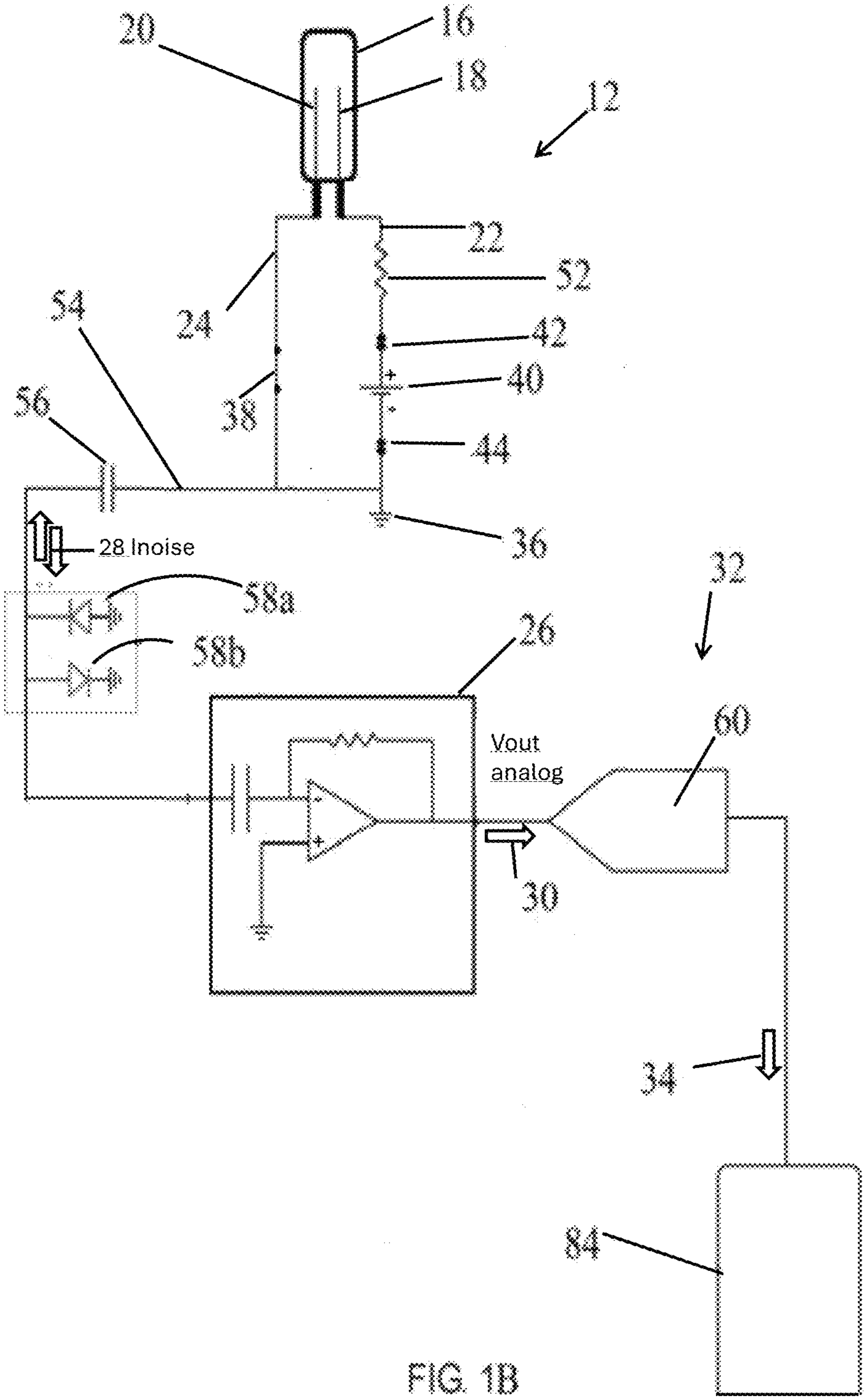
Figure 1C:
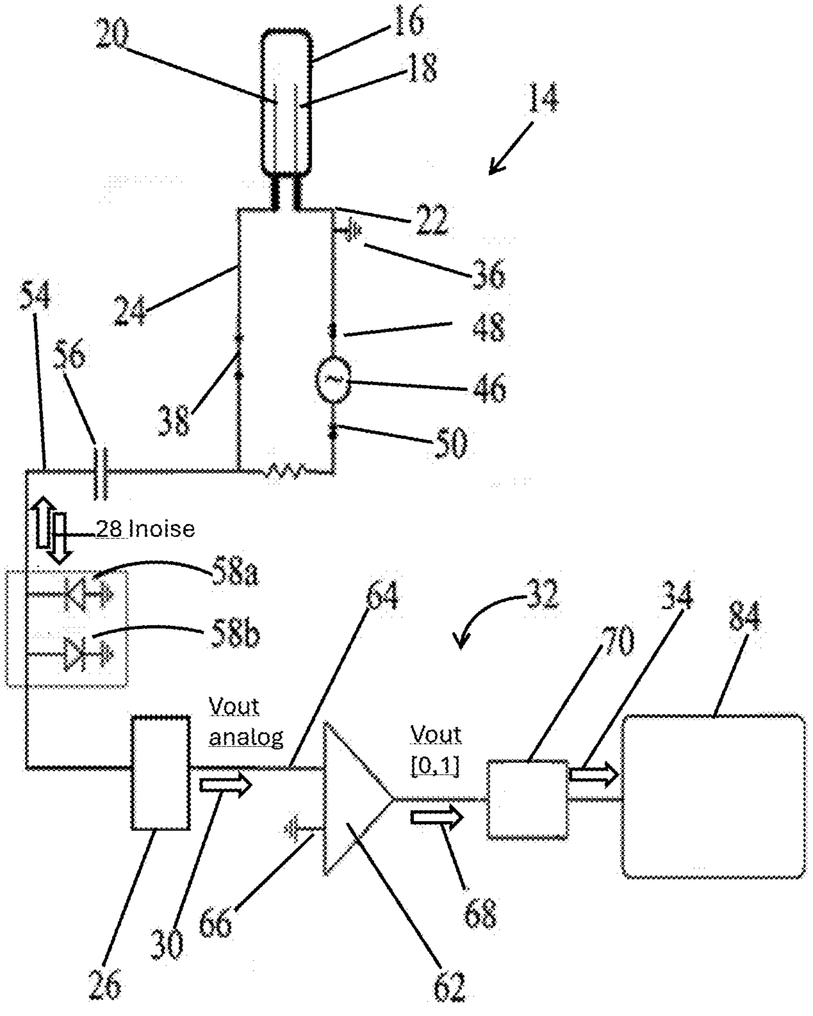

The teachings herein are discussed with reference to exemplary embodiments of random number generator circuits according to the teachings herein: circuit 10 depicted in FIG. 1A, circuit 12 depicted in FIG. 1B and circuit 14 depicted in FIG. 1C. In FIGS. 1A, 1B and 1C, random number generator circuits 10, 12 and 14, comprise:

a. a low-pressure cold-cathode glow discharge lamp 16, having:
   a first lamp electrode 18, and
   a second lamp electrode 20;
b. a first line 22 for providing electrical connection between the first lamp electrode 18 and a first electrode of an electrical power supply;
c. a second line 24 for providing electrical connection between the second lamp electrode 20 and a second electrode of an electrical power supply;
d. electrically connected to a line selected from the group consisting of the first line 22 and the second line 24, a transimpedance unit 26 configured to:
   receive from the selected line an analog current-noise signal 28 caused as a result of the operation of the glow discharge lamp 16; and
   generate and output an analog voltage signal 30 that is representative of the variation of the received analog current-noise signal 28.

A random number generator circuit according to the teachings herein may functionally be associated with a digitizer that is configured to receive an analog voltage signal 30 from the transimpedance unit 26 and to generate and output a digital data signal that is representative of the variation of the received analog current-noise signal. In some embodiments, the circuit is devoid of a digitizer and may be functionally-associated with a digitizer that is not part of the circuit. Alternatively, in some embodiments, the device may further comprise a digitizer 16/32 configured to:

receive an analog voltage signal 30 from the transimpedance unit 26; and
generate and output a digital data signal 34 that is representative of the variation of the received analog current-noise signal 28.

In some embodiments, the digital data signal 34 constitutes a series of random numbers, preferably in serial format.

In preferred embodiments, the random number generator circuit is configured to ensure operation of the glow discharge lamp in the normal glow discharge regime.

In some embodiments, the circuit is grounded through at least one of the first line 22 and the second line 24. In FIGS. 1A and 1B, circuits 10 and 12 are grounded through second line 24 with ground 36. In FIG. 1C, circuit 14 is grounded through first line 22 with ground 36.

In some embodiments, the circuit comprises a switch. In FIGS. 1B and 1C, circuits 12 and 14 include a switch 38 that allows the circuits to operate when a respective switch 38 is closed as depicted or for the circuits to cease operation when a respective switch 38 is opened. In some embodiments, the circuit is devoid of a switch. In typical embodiments where the circuit is devoid of the switch, operation and ceasing operation of the circuit is controlled by a device with which the circuit is functionally associated. In FIG. 1A, circuit 10 is devoid of a switch.

Low-Pressure Cold-Cathode Glow Discharge Lamp

The glow discharge lamp is any suitable low-pressure cold-cathode glow discharge lamp, e.g., a low-pressure cold-cathode glow discharge lamp, typically comprising at least 80% of a gas selected from the group consisting of helium, neon, argon, krypton and xenon at a pressure of about 1-25 mbar. In some preferred embodiments, the glow discharge lamp is a neon glow lamp. In preferred such embodiments, the neon glow lamp comprises a Penning gas mixture, typically of about 97%-99.5% neon and 0.5%-3% argon or helium As known in the art, some glow discharge lamps start more easily when exposed to light as opposed to when started in complete darkness. Accordingly, in some embodiments, a device implementing or using a circuit according to the teachings herein includes a light source that illuminates the glow discharge lamp to ease starting of the lamp in dark condition. As known in the art, suitable such light sources typically emit blue or violet wavelengths, e.g., a blue or violet LED.

As known in the art, some glow discharge lamps include coated electrodes (e.g., electrodes coated with strontium or barium) to lower the ionization voltage. In some such lamps, the coating on the electrodes degrades over time, changing the electrical characteristics of the lamp. Accordingly, in some embodiments a glow discharge lamp used for implementing the teachings herein includes non-coated electrodes.

As known in the art, some glow discharge lamps include a radiation source such as an ionizing gas, e.g., $^{85}$Kr, in the gas mixture to reduce the voltage required to start the lamp and to enhance discharge. Some such ionizing gases degrade with time (in the case of $^{85}$Kr, a result of the 10.8 year half-life) so that the electrical characteristics of the lamp may change. Accordingly, although it has not been demonstrated that such changes effect the randomness of a series of numbers, in some preferred embodiments, a glow lamp used for implementing the teachings herein is devoid of an ionizing gas, especially devoid of $^{85}$Kr.

As known in the art, the first hours (12-48) of operation of a glow lamp are characterized by relatively substantial changes in some electrical parameters such as the maintaining voltage. Accordingly, although it has not been demonstrated that such changes effect the randomness of a series of numbers, in some preferred embodiments, a glow lamp used for implementing the teachings herein is aged prior to use for the generation of random numbers to ensure sufficient stability. Such aging can be performed in any suitable way such as known to a person having ordinary skill in the art, for example, by operating the lamp at 1.5-3 times nominal current for a period of 24-96 hours.

Power Supply

In some embodiments, the circuit further comprises a power supply, in some such embodiments a DC power supply and in some such embodiments an AC power supply. As known in the art, power supplies typically produce noise. It is not known whether or not the noise produced by a given power supply is random or not. Accordingly, preferably the power supply is a low-noise power supply. In some embodiments, a low-noise power supply has a voltage noise of less than 10 mV, less than 1 mV and even less than 0.1 mV.

Direct Current Power Supply

In some embodiments, the circuit comprises a DC power supply including a power supply cathode and a power supply anode, each in electrical communication with one of the two lamp electrodes through a respective line, thereby providing power for operation of the glow discharge lamp. In such embodiments, any suitable DC power supply configured to provide any suitable DC current at any suitable voltage, which exact current and voltage are typically dependent on the nature of the glow discharge lamp, typically above 60 V. In some embodiments, the DC power supply voltage is between 80 V and 120 V, for example about 100 V. In some embodiments, the DC power supply is configured to provide between 1 and 10 mA. Circuit 12 in FIG. 1B includes a DC power supply 40 with a power supply anode 42 and a power supply cathode 44, each one of the two electrodes 42 and 44 electrically connected to one of the two lines 22 and 24.

Alternating Current Power Supply

Alternatively, in some embodiments, the circuit comprises an AC power supply including two power supply electrodes, each in electrical communication with one of the two lamp electrodes through a respective line, thereby providing power for operation of the glow discharge lamp. In such embodiments, any suitable AC power supply configured to provide any suitable AC current at any suitable voltage and at any suitable frequency is provided, which current, voltage (typically greater than 60 V) and frequency are typically dependent on the nature of the glow discharge lamp. In some embodiments, the AC power supply voltage is between 80 V and 120 V, for example about 100 V. In some embodiments, the AC power supply is configured to provide between 1 and 10 mA. In some embodiments, the AC current provided by the AC power supply is less than 100 Hz, e.g., 50 Hz-60 Hz. Circuit 14 in FIG. 1C includes an AC power supply 46 with a first power supply electrode 48 and a second power supply electrode 50, each one of the two electrodes 48 and 50 electrically connected to one of the two lines 22 and 24.

In some embodiments, a random number generator circuit that comprises an AC power supply and/or is configured to operate with an AC power supply includes a filter configured to remove the frequency of the AC power supply and all harmonics thereof. Such a filter is preferably a notch filter.

In some such embodiments where the random number generator circuit includes a digitizer, the digitizer including such a notch filter as a component. Typically, such a notch filter of the digitizer is configured to receive an analog voltage signal from the transmipedance unit, to filter the received analog voltage signal and to output the filtered analog voltage signal to other components of the digitizer.

In some such embodiments where the random number generator circuit includes a digitizer, the random number generator circuit comprises such a notch filter that is separate from the digitizer, the notch filter located between the transimpedance unit and the digitizer. In such embodiments, the notch filter is configured to receive an analog voltage signal from the transimpedance unit, to filter the received analog voltage signal and to output the filtered analog voltage signal to the digitizer.

In some such embodiments where the random number generator circuit does not include a digitizer, the random number generator circuit comprises such a notch filter, the notch filter may be located after the transimpedance unit. In such embodiments, the notch filter is configured to receive an analog voltage signal from the transimpedance unit, to filter the received analog voltage signal and to output the filtered analog voltage signal, for example, to a digitizer which is functionally associated with the random number generator circuit.

In some such embodiments where the random number generator circuit does not include a digitizer, the random number generator circuit is devoid of a such notch filter. Typically, it is advantageous to use such embodiments of the circuit with a digitizer that includes a notch filter, or to use a separate notch filter between the device and a digitizer, Resistor In some embodiments, one or both of the first line and the second line include one or more resistors. As known in the art, such one or more resistors may be necessary to control the current through the glow discharge lamp during operation and protect it thereof, thereby ensuring operation of the glow discharge lamp in the normal glow discharge regime. Any suitable resistor or combination of resistors, located on the first line and/or the second line providing any suitable total may be used, for example a total resistance of between 5 to 20 kOhm, e.g., a total of 10 kOhm resistance.

In FIGS. 1A and 1C, circuits 10 and 14 include a single 10 kOhm resistor 52 on second line 24. In FIG. 1B, circuit 12 includes a single 10 kOhm resistor 52 on first line 22.

Electrical Connection of the Transimpedance Unit

As noted above, a circuit according to the teachings herein may comprise a transimpedance unit 26 electrically connected to a line selected from the group consisting of the first line 22 and the second line 24. Typically, such connection is through a third line 54 that is electrically connected to the selected line (either the first or the second line) and to the transimpedance unit. The connection to one of the first line 22 or second line 24 can be in any suitable location, for example, between the lamp 16 and the power supply cathode or power supply anode (for circuits configured for use with a DC power supply) or on any side of a resistor 52 that is distal from the ground terminal 36 and/or switch (not shown).

In FIG. 1A, circuit 10 comprises a third line 54 that is electrically connected with second line 24 between resistor 52 and lamp 16. In FIG. 1B, circuit 12 comprises a third line 54 that is electrically connected with first line 24 between lamp electrode 20 and resistor 52. In FIG. 1C, circuit 14 comprises a third line 54 that is electrically connected with second line 24 between lamp electrode 20 and resistor 52.

Current Filter

Embodiments of a circuit according to the teachings herein are configured to generate and output an analog voltage signal that is representative of the variation of the analog current-noise signal caused as a result of operating the circuit with the glow discharge lamp.

Accordingly, in some embodiments, the circuit comprises a current filter that is configured to allow only the analog current-noise signal (AC part of the current) to reach the transimpedance unit, preferably by preventing the non-varying part (DC part) of the current that flows through the glow discharge lamp, first line and second line from reaching the transimpedance unit. In some embodiments, such a current filter comprises a coupling capacitor on the third line that provides electrical connection between the first line or second line and the transimpedance unit.

In such embodiments, any suitable coupling capacitor can be used. Typical such a coupling capacitor has a capacitance of greater than 0.01 microFarad and less than 1 microFarad, e.g., in the order of 0.1 microFarad.

Third line 54 of circuits 10, 12 and 14 depicted in FIGS. 1A, 1B and 1C respectively includes a coupling capacitor 56 that functions as a current filter by allowing only analog current-noise signal 28 to reach transimpedance unit 26.

Current-Spike Protector

The inventors have discovered that circuits that include a glow discharge lamp, such as a circuit according to the teachings herein, can occasionally experience very fast current spikes. Such current spikes have no substantial deleterious effect on high voltage components (i.e., components such as the glow discharge lamp that are configured to operate at voltages of greater than 60 V, typically ~100V). However, in circuits that include low-voltage components (such as components (e.g., the transimpedance unit) according to the teachings herein which interface with computer systems operating at voltages of not more than about 12 V, typically between 3 and 5 V), such current spikes often destroy the low-voltage components. One option is to place a fuse between the high-voltage and low-voltage components so that any current spike trips the fuse. Challenges with using a fuse include that fuses often trip too slowly during very fast current spikes (such as found by the inventors during use of glow discharge lamps). Further, a circuit with a tripped fuse is inoperable until the fuse is replaced.

To overcome the particular problem of current-spikes that occur in a circuit including a glow discharge lamp, herein is disclosed a current-spike protector that comprises two grounded fast-recovery diodes.

According to an aspect of some embodiments of the teachings herein there is provided a circuit comprising a high-voltage portion including a glow discharge lamp, a low-voltage portion and an electrical line providing electrical connection between the high-voltage portion and the low-voltage portion, comprising two grounded fast-recovery diodes electrically connected to the electrical line, the two diodes electrically oriented in opposite directions. In some embodiments between the high-voltage portion of the circuit and the two diodes is a capacitor. Any suitable fast-recovery diode may be used. Preferably, the diodes have a recovery time that is shorter than 25 ns, shorter than 10 ns, shorter than 5 ns, shorter than 2 ns and in some embodiments less than or equal to 1 ns.

Specifically, some embodiments of a random number generator circuit according to the teachings herein comprise two grounded fast-recovery diodes electrically connected to a third line which electrically connects the transimpedance unit to the first or second line, the two diodes electrically oriented in opposite directions. In some embodiments, of the circuit, the glow discharge lamp is configured to operate at a voltage of greater than 60 V, the transimpedance unit is configured to operate with a power supply providing power at not more than about 12 V and the circuit further comprises a current-spike protector comprising two grounded fast-recovery diodes. In embodiments that include a current filter such as a capacitor, the two diodes are preferably located between the capacitor and the transimpedance unit. Any suitable fast-recovery diode may be used. Preferably, the diodes have a recovery time that is shorter than 25 ns, shorter than 10 ns, shorter than 5 ns, shorter than 2 ns and in some embodiments less than or equal to 1 ns.

Circuits 12 and 14 depicted in FIGS. 1B and 1C respectively include two grounded fast-recovery diodes 58*a* and 58*b* may electrically be connected to third line 54, diodes 58*a* and 58*b* may electrically be oriented in opposite directions.

Transimpedance Unit

As noted above, the random number generator circuit comprises a transimpedance unit configured to receive an analog current-noise signal from either the first or the second line that varies as a result of the operation of the circuit and to generate and output an analog voltage signal that is representative of the variation of the received analog current-noise signal. Any suitable transimpedance unit can be used. A person having ordinary skill in the art is able, without undo experimentation, to acquire and make a suitable transimpedance unit.

In some embodiments, a transimpedance unit is or comprises a transimpedance amplifier (TIA) such as known in the art. In some embodiments, the amplitude of the analog current-noise signal received by the transimpedance unit is relatively low so that a TIA also amplifies the signal. In some embodiments, the TIA is a wide-band amplifier, configured to amplify all frequencies of the received analog current-noise signal. Alternatively, in some embodiments the TIA is a frequency-dependent amplifier configured to amplify only selected frequencies or only frequencies above a certain frequency of the received analog current-noise signal. In some such embodiments, a frequency-dependent amplifier is configured to only amplify pre-determined frequencies, for example, in some embodiments, frequencies that are above 2 MHz, above 3 MHz, above 4 MHz and even above 5 MHz.

A person having ordinary skill in the art is able to design a suitable TIA or to select a suitable commercially-available TIA, for example, from Texas Instruments Inc. (Dallas, Texas, USA).

In FIGS. 1A and 1C are depicted transimpedance units 26 without excess details, configured to receive analog current-noise signal 28 and to output analog voltage signal 30.

In FIG. 1B is depicted a specific arrangement of electronic components that a person having ordinary skill in the art recognizes as constituting a transimpedance unit 26, configured to receive analog current-noise signal 28 and to output analog voltage signal 30.

Parasitic and undesired noise that may add to the random noise of the analog current-noise signal 24 that varies as a result of the operation of the glow discharge lamp 16 and may decrease the level of randomness of the combined signal. In some embodiments in order to reduce the undesired influence of environment noises, the random noise of the analog current-noise signal 24 may be converted into an optical signal which is much more immune to environmental noises. Current-to-optical signal converting unit 25 is shown in FIG. 1A, as an alternative to the circuitry handling the analog current-noise signal 24. Unit 25 may be any unit capable of receiving the current-noise signal and converting it to optical signal in optic fiber 25A.

Digitizer

As noted above, for use a random number generator circuit is functionally associated with a digitizer that is configured to receive an analog voltage signal from the transimpedance unit and to generate and output a digital data signal that is representative of the variation of the received analog current-noise signal. In some embodiments, the circuit is devoid of a digitizer and, for use, is functionally-associated with a digitizer that is not part of the circuit. Alternatively, in some embodiments, the device further comprises a digitizer configured to: receive an analog voltage signal from the transimpedance unit; and to generate and output a digital data signal that is representative of the variation of the received analog current-noise signal.

Any suitable digitizer can be used together with a circuit according to the teachings herein, whether as a component of the circuit or as a separate component or device which is functionally associated with the circuit. In some embodiments, a digitizer comprises an analog-to-digital converter. In some embodiments, a digitizer comprises a comparator.

Analog-to-Digital Converter (ADC)

In some embodiments, the digitizer comprises an analog-to-digital converter (ADC) that is functionally-associated with the transimpedance unit. The transimpedance unit is configured to output an analog voltage signal to the ADC. The ADC receives the analog voltage signal and outputs a digital data signal that is representative of the variation of the analog current-noise signal received by the transimpedance unit.

Circuit 10 in FIG. 1A is devoid of a digitizer as a component thereof, but is depicted functionally associated with an ADC 60 as digitizer 32. Circuit 12 in FIG. 1B comprises an ADC 60 as digitizer 32. During operation of circuits 10 and 12, an analog current-noise signal 28 that varies as a result of the operation of the glow discharge lamp 16 is produced, passes coupling capacitor 56 and is received by transimpedance unit 26. Transimpedance unit 26 outputs an analog voltage signal 30 to ADC 60. ADC 60 digitizes the received analog voltage signal 30 and outputs digital data signal 34 that is representative of the variation of the received analog current-noise signal 28. Digital data signal 34 output by ADC 60 is a serial series of preferably random numbers.

In embodiments of the circuit having an ADC or functionally-associated with an ADC, the output digital voltage signal has any suitable digital resolution (number of discrete values each sample of the signal can have) and is typically determined by the ADC used. Considering the attributes of the noise generated by a low-pressure cold-cathode glow discharge lamp and typical commercially-available ADCs, the digital resolution is generally between 10 and 16 bits.

It has been found that the frequency bandwidth of the noise produced by a low-pressure cold-cathode glow discharge lamp is in the order of several GHz. Accordingly, in embodiments of the circuit having an ADC or functionally-associated with an ADC, the sampling rate is any suitable rate up to several GHz and is typically determined by the ADC used. Typical commercially-available ADCs have a sampling rate of between 1 and 10 Gigasamples per second and, accordingly, the output digital voltage signal has a data rate of not less than 1 Gigasample/s, typically between 1 and 10 Gigasample/s.

Comparator

In some embodiments, a digitizer comprises a comparator functionally-associated with a serial communication unit. The comparator is configured to receive an analog voltage signal from the transimpendance unit of the circuit and to output a binary voltage signal having a value of 0 or 1 to the serial communication unit. The serial communication unit is configured to receive the binary voltage signal and to output a serial digital data signal that is representative of the variation of the analog current-noise signal received by the comparator.

FIG. 1C depicts a random number generator circuit 14 with a digitizer 32 that includes a comparator 62 with a first comparator input 64 configured to receive analog current-noise signal 30 and a second comparator input 66 grounded so that comparator 62 outputs a binary voltage signal 68 having a value of either 0 or 1 to a serial communication unit 70.

Figure 1D:
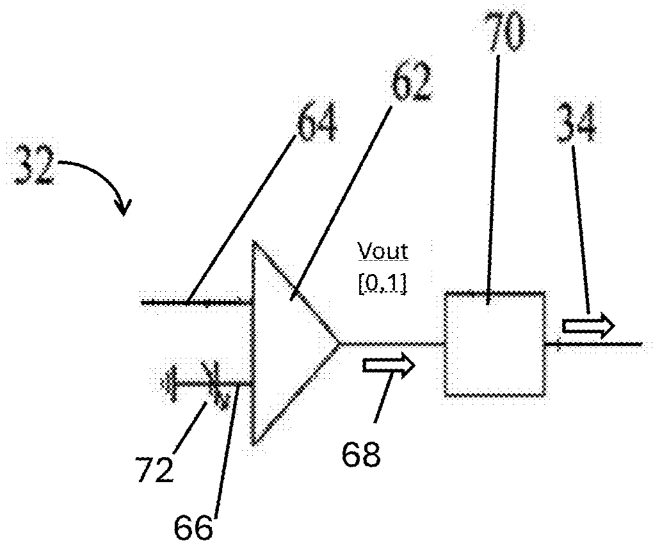
FIG. 1D schematically depicts an embodiment of comparator unit useful for implementing the teachings herein.

FIG. 1D depicts an alternate digitizer 32 that includes a comparator 62 with a first comparator input 64 configured to receive analog current-noise signal 30 and a second comparator input 66 functionally associated with a variable DC bias voltage 72. Variable-bias DC voltage 72 allows calibration of comparator 62: the output values may be monitored over a period of time and any deviation from a value of 0.5 may be corrected by changing the bias-DC voltage 72 accordingly, in a manner with which a person having ordinary skill in the art is familiar.

Serial communication unit 70 is any suitable serial communication unit. A person having ordinary skill in the art is able, subsequent to perusal of the specification, to select a suitable serial communication unit, for example, a unit configured to use a standard USB-C protocol, capable of 40 GB/sec.

High-Pass Filter

In some embodiments a device further comprises a high-pass filter configured to filter out low-frequency components of a signal. In some embodiments, the high-pass filter is configured to filter-out pre-determined frequencies. In some embodiments, the high-pass filter is configured to filter out frequencies that are below 2 MHz, below 3 MHz, below 4 MHz and even below 5 MHz.

In some embodiments, the high-pass filter is a high-pass current filter configured to filter out low-frequency components of the analog current-noise signal received from a line selected from the first and second line so that the transimpedance unit receives an analog current-noise signal with a reduced intensity of low-frequency components. In some such embodiments, the high-pass current filter is a component of the transimpedance unit. In some such embodiments, the high-pass current filter is a component separate from the transimpedance unit. Preferably, such a high-pass filter is located on a third line that electrically connects the first or second line with the transimpedance unit. In embodiments that include a coupling capacitor, the high-pass filter is preferably located after the coupling capacitor. In FIG. 1A, device 10 comprises a high-pass filter 76 between coupling capacitor 56 and transimpedance unit 26. A person having ordinary skill in the art is able to design a suitable high-pass filter or to select a suitable commercially-available amplifier, for example, from Wainwright Instruments GmbH, Andechs, Germany.

In some embodiments, the high-pass filter is a high-pass voltage filter configured to filter out low-frequency components of the analog voltage signal. In some such embodiments, the high-pass voltage filter is a component of the transimpedance unit so that the analog voltage signal output by the transimpedance unit has a reduced intensity of low-frequency components. In some such embodiments, the high-pass voltage filter is a component separate from the transimpedance unit and is configured to receive the analog voltage signal output from the transimpedance unit and to output an analog voltage signal with a reduced intensity of low-frequency components.

Populated Circuit Board

A circuit according to the teachings herein can be implemented in any suitable fashion, in any suitable package using any suitable technology.

In some embodiments, the circuit according to the teachings herein is provided as part of a populated circuit board (PCB). In typical such embodiments, the PCB is devoid of a power supply and receives power when the PCB is plugged into an appropriate socket of a suitable device. In preferred such embodiments, the high-voltage components and the low-voltage components are located on different faces of the PCB. For example, in such PCB embodiments similar to circuits 10, 12 and 14 depicted in FIGS. 1A, 1B and 1C, the high-voltage components such as lamp 16, first line 22, second line 24 and resistor 52 are located on the high-voltage face of the PCB, transimpedance unit 26 and comparator 62 are located on the different low-voltage face of the PCB and third line 54 passes through a hole in the PCB, providing electrical communication between the high-voltage face and the low-voltage face. Components such as coupling capacitor 56 or diodes 58*a* and 58*b* can be located on either the low-voltage face or the high-voltage face, whichever is more convenient.

In some such embodiments, the circuit includes a digitizer on the PCB. Alternatively, in some such embodiments, the circuit is devoid of a digitizer on the PCB.

In FIG. 2, a PCB 78 is schematically depicted. PCB 78 accommodates an embodiment of a random number generator circuit according to the teachings herein similar to circuit 10 depicted in FIG. 1A. PCB 78 includes a high-voltage face 80 and a low-voltage face 82. On high voltage face 80 are located a low-pressure cold-cathode glow discharge lamp 16 and coupling capacitor 56 as well as other, non-depicted components. On low-voltage face 82 are located high-pass filter 76 and transimpedance unit 26. Third line 54 passes through PCB 78 from high-voltage face 80 to low-voltage face 82. When PCB 78 is plugged into a port of a suitable computing device, a first line and second of the circuit are functionally-associated with a power supply that provides the requisite high voltage for operation of lamp 16. The output of transimpedance unit 26 is functionally-associated with a digitizer (e.g., ADC) of the computing device through the port.

Use of the Generated Digital Voltage Signal

As noted above, a random number generator circuit according to the teachings herein produces and outputs a digital data signal that constitutes a series of random numbers.

Use of Only Some of the Random Data

As noted above, in some embodiments that include a digitizer with an ADC, the digital data signal comprises a series of samples, each sample typically having 10-16 bits. In some embodiments, all the data is used. However, as known in the art, it is often preferred to use only some of the bits, for example, only bits 3 and 4 of every sample. Such limited use of data generated by an HRNG is well-known, for example, as implemented by the Quantis QRNG HRNG by ID Quantique (Geneva, Switzerland).

Direct Use by a Computer Processor

In some embodiments, the digital data signal is provided to a computer processor as a series of random numbers, in some embodiments as individual bits having a value of either 0 or 1. In such embodiments, component 84 depicted in FIGS. 1A, 1B and 1C is a computer processor.

In some such embodiments, the random number generator circuit is a component of a computing device, for example a component of computer base circuit such as FPGA. Thus, according to an aspect of some embodiments of the teachings herein, there is provided a computing device comprising:

- a random number generator circuit according to the teachings herein for generating and outputting a digital data signal that constitutes a series of random numbers; and
- a computer processor configured to receive the digital voltage signal.

Storage Prior to Use

In some embodiments, the digital data signal is output to a digital storage module and the digital storage module is configured to store values of the digital data signal as random numbers (typically as a series of random numbers) for future use. A computing device with a computer processor functionally associated with the digital storage module accesses stored values when a random number is required. In such embodiments, component 84 depicted in FIGS. 1A, 1B and 1C is a digital storage module. Any suitable digital storage module using any suitable storage technology may be used, including known storage technologies (e.g., semiconductor storage, especially flash memory such as NAND memory, NOR memory, floating-gate MOSFETs, and also EEPROMs; magnetic photoconductors; holographic data storage; phase-change memory; optical storage (CD-R, DVD-R, DVD+R, BD-R, UDO); magneto-optical storage; magnetic storage). The speed of the storage technology is selected to, inter alia, based on the speed requirements of the specific implementation.

In some such embodiments, the digital storage medium and the random number generator circuit are components of the same device. Thus, according to an aspect of some embodiments of the teachings herein, there is provided a device comprising a random number generator circuit according to the teachings herein for generating and outputting a digital data signal that constitutes a series of random numbers and a digital storage module configured to store values of the digital voltage signal as random numbers.

Array of Circuits

The data rate of a circuit according to the teachings herein is theoretically limited by the electronic bandwidth of noise of the glow discharge lamp to several Gigahertz, estimated at around 10 GHz and in some embodiments, practically limited by the availability of a reasonably priced ADC to 1-10 Gigabits/second.

A data rate of 1-10 Gigabits/second may be insufficient for some implementations. For example, as is known to a person having ordinary skill in the art of cryptography, optimal encryption is achieved using one-time pad encryption where the key and the message are of the same length. In practical terms, this means that even the high rate of random number generation of a circuit according to the teachings herein may be insufficient for some encryption implementations.

However, since an individual circuit is small, cheap, reliable and has modest power requirements, in some embodiments a device (e.g., a computing device, a storage device, a random number generating device) is provided, the device comprising multiple circuits as described above, each circuit independently generating a series of random number. Thus, according to an aspect of some embodiments of the teachings herein there is provided a device comprising a number of random number generator circuits as described herein, the number being at least two. In some embodiments the number is at least 8, at least 16, at least 32 and even at least 128 individual circuits.

For example, in some embodiments, such a device includes a number of at least two circuits (such as circuits 10 and 12 of FIG. 1A or FIG. 1B) where each circuit has an own transimpedance unit but share a single ADC. Such embodiments are useful, for example to allow the use of a single cheap slow (1 GHz) ADC with 32-channels to provide a 32 Gigasample/s digital data signal rather than a single expensive fast (10 GHz) ADC with 1 channel to provide a 10 Gigasample/s digital data signal.

In FIG. 3 is depicted a device 86 comprising a component 84 (in some embodiments a computer processor 84 and in some alternate embodiments a digital storage module 84) including a multi-channel ADC 60, functionally associated with four random number generator circuits according to the teachings herein 88', 88'', 88''' and 88'' according to the teachings herein, each circuit 88 comprising a transimpedance unit that outputs a respective analog voltage signal 30 to a different channel of ADC 60.

EXPERIMENTAL

Device Design and Construction

A device according to the teachings herein, similar to device 12 as discussed above with reference to FIG. 1B was constructed and tested. Lamp 16 was an N523 standard brightness green neon lamp from International Light Technologies (Peabody, Massachusetts, USA). DC power supply 36 was a standard laboratory power supply provided 5 mA DC at 100V from TDK-Lambda Corporation (Nihonbashi, Chuo-ku, Tokyo, Japan). Resistor 48 was a standard 10 kOhm resistor. Capacitor 52 was a standard 0.1 microFarad capacitor. Diodes 54*a* and 54*b* were standard germanium fast-recovery diodes having a recovery time of 1 ns. Transimpedance amplifier 56 was built on perforated bread board using standard components based on a LM741 circuit by Analog Devices, Inc., Norwood, MA, USA. ADC 58 was a component of a 200 MHz electronic bandwidth digital oscilloscope (Keysight Technologies Israel 1999 Ltd., Petah Tikva, Israel).

Results

Operation Regime

As known to a person having ordinary skill in the art, glow discharge lamps have different operation regimes depending on the supplied current and voltage.

When a lamp is first ignited at low voltage (up to ~60V) there is no emission and no current flows through the lamp. As the voltage is gradually increased (up to ~65V), current increases up to about $10^{-6}$ A accompanied by dark discharge. At a certain breakdown voltage (which depends, inter alia, on the composition of the gas and gas pressure inside the lamp), resistance in the lamp drops and the current increases to between $10^{-6}$ and $10^{-2}$ A. At higher voltages/lower currents there are the corona discharge and subnormal glow discharge regimes. At a voltage of about 100V and a current of about $10^{-2}$ A the lamp produces a steady emission of light in the "normal glow" regime. If the current through the lamp is not limited, the current quickly increases until the lamp enters the "abnormal glow" regime, then reaches a glow-arc transition followed by an electric arc and lamp failure.

For implementing the teachings herein, the lamp was operated in the normal glow regime.

First Series of Samples

The device was operated so that the lamp was in the normal glow regime and the oscilloscope was operated to record a total of 640 series of samples at a sample rate of 320 megasamples (MS)/sec for 2 microseconds, so that each series included 640 samples.

Figure 4A:
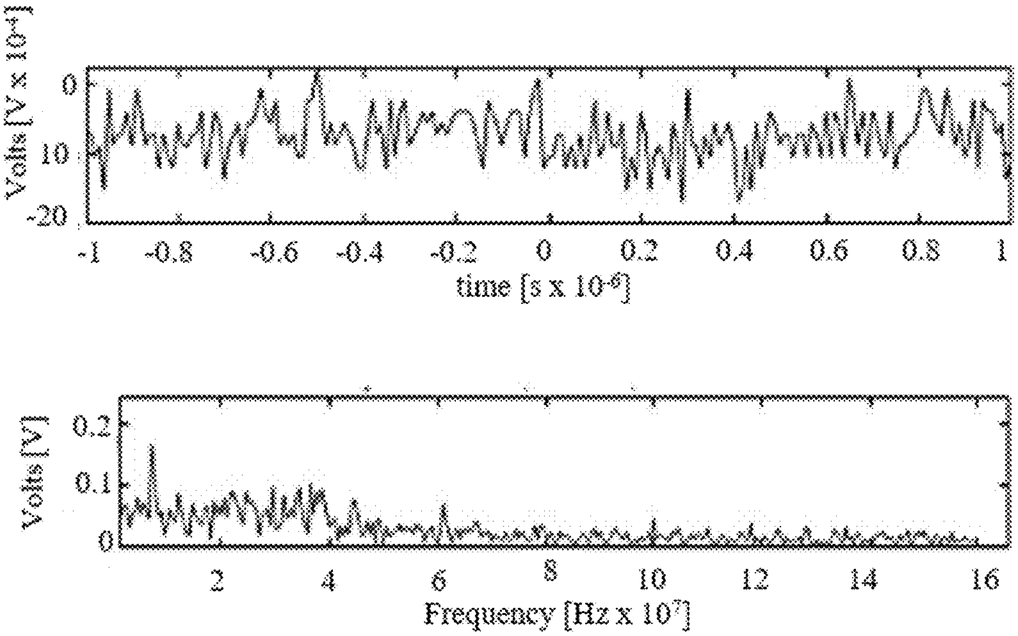
FIGS. 4A, 4B and 4C are graphs showing representative graphs of a digital data signal generated by an embodiment of a device according to the teachings herein over a period of 2 microseconds in the time-domain (upper graph) and the frequency domain (lower graph)
Figure 4B:
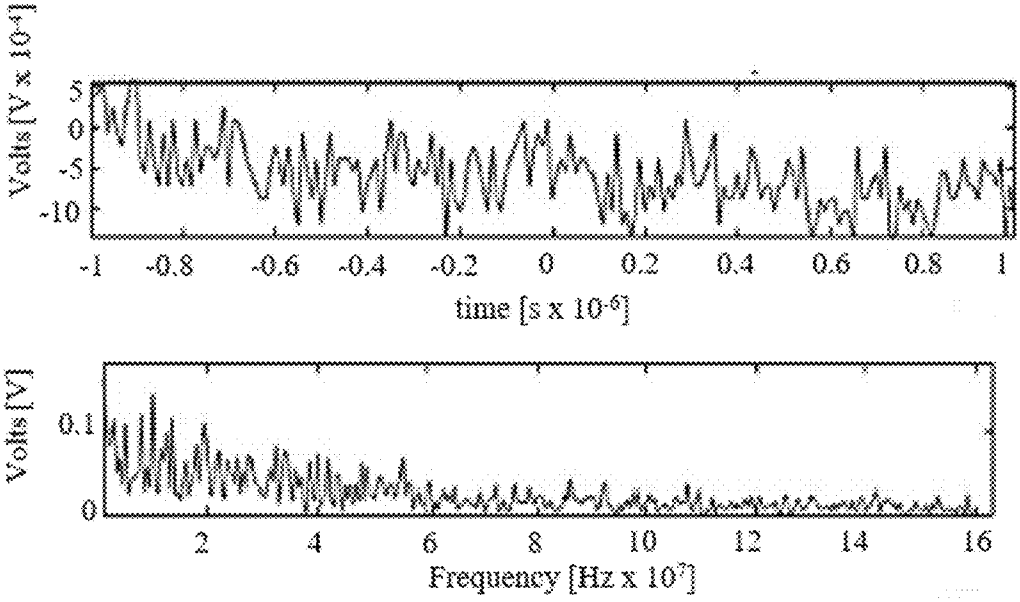
Figure 4C:
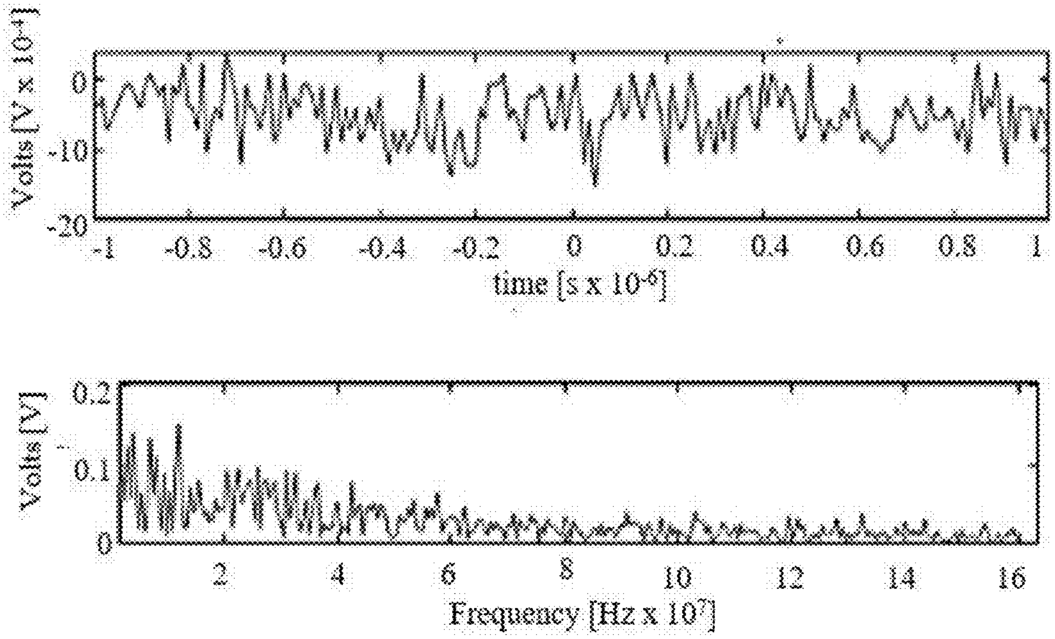

Three representative series (#s 46, 50 and 51) of the 640 series are reproduced in FIGS. 4A, 4B and 4C, where:

The upper graph is the time domain where the x-axis is time in microseconds and the y-axis is the sample value between 0 and $-20\times10^{-4}$ V (i.e., 0 to −2 mV); and The lower graph is the frequency domain where the x-axis is frequency and the y-axis is relative amount of the frequency.

Second Series of Samples

The device was operated and the oscilloscope was operated to record a total of 640 series of samples at a sample rate of 100 megasamples (MS)/sec for 10 microseconds, so that each series included 1000 samples.

Figure 5A:
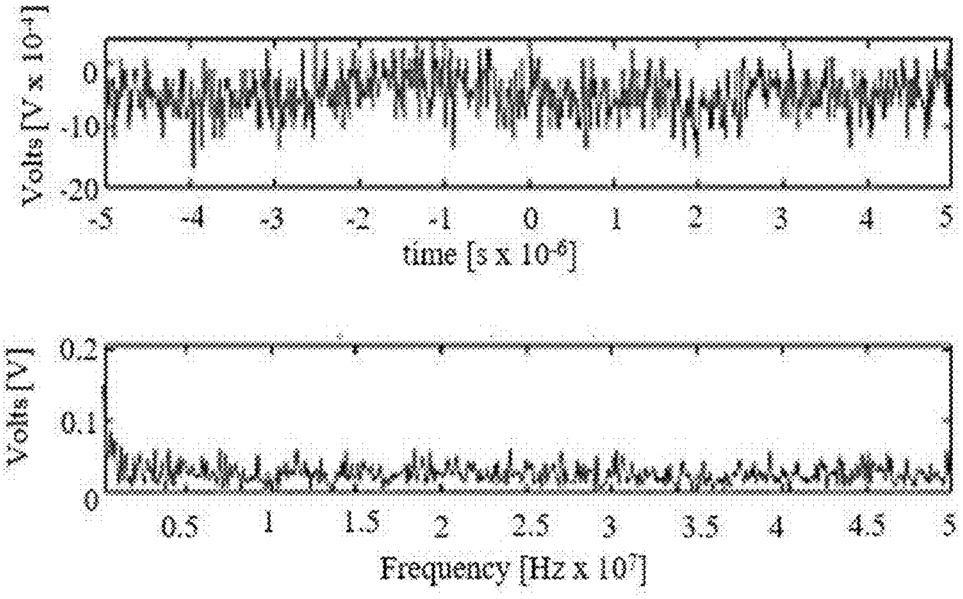
FIGS. 5A, 5B and 5C are graphs showing representative graphs of a digital data signal generated by an embodiment of a device according to the teachings herein over a period of 10 microseconds in the time-domain (upper graph) and the frequency domain (lower graph)
Figure 5B:
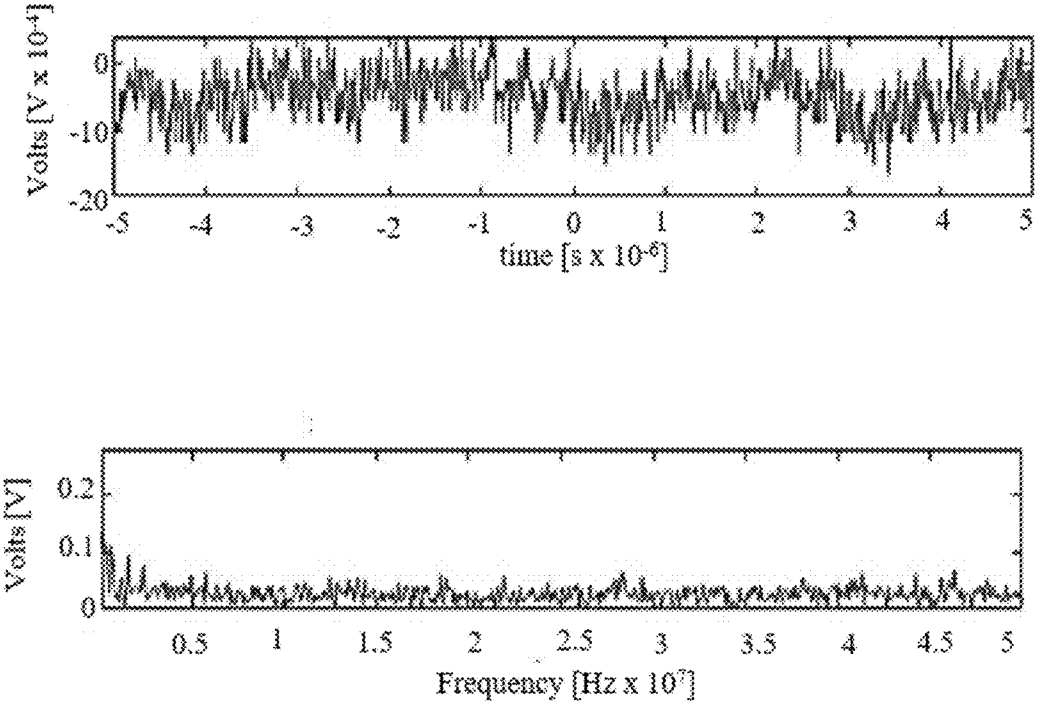
Figure 5C:
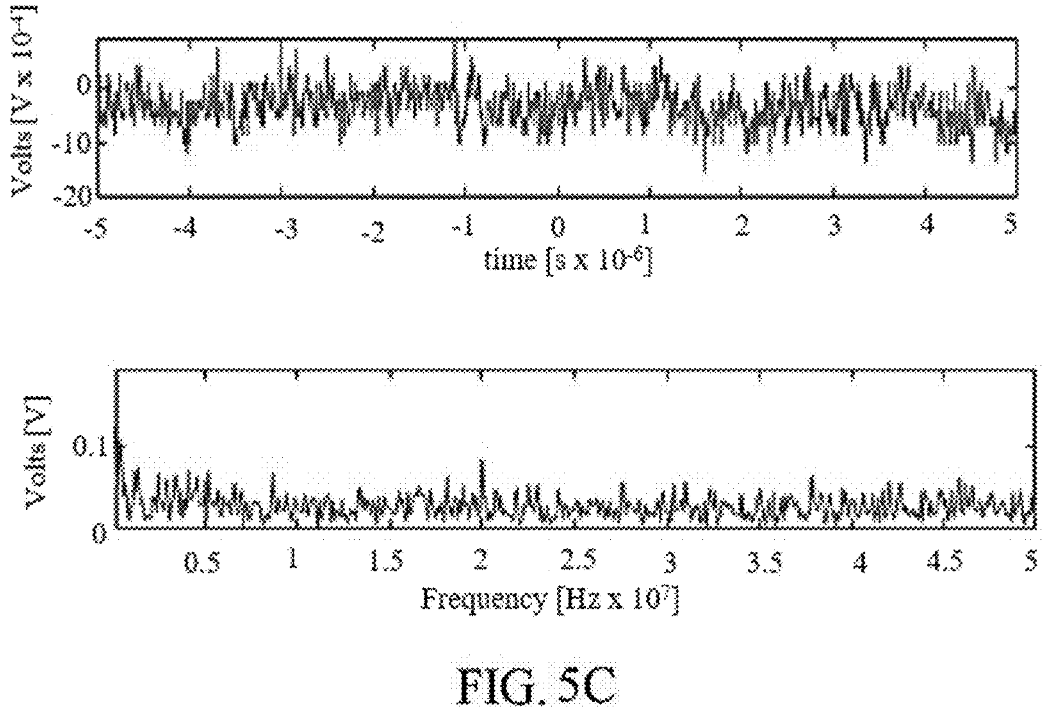

Three representative series (#s 63, 64 and 65) of the 640 series are reproduced in FIGS. 5A, 5B and 5C, where the upper graph and lower graph are as described for FIGS. 4A, 4B and 4C.

Third Series of Samples

The device was operated and the oscilloscope was operated to record a total of 640 series of samples at a sample rate of 100 megasamples (MS)/sec for 15 microseconds, so that each series included 1500 samples.

Figure 6A:
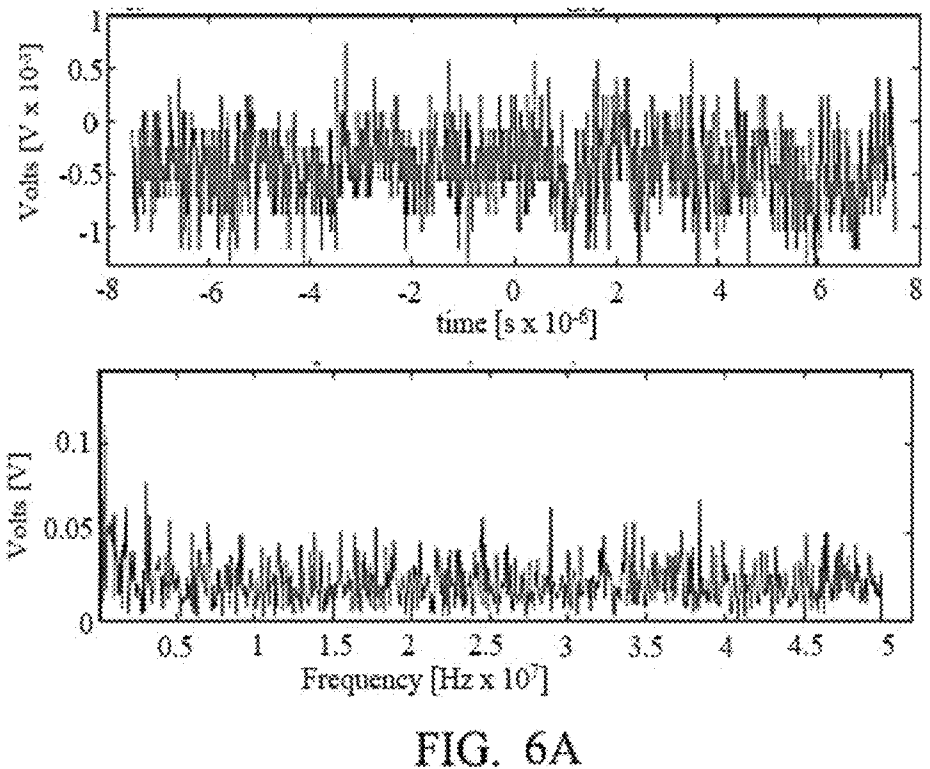
FIGS. 6A and 6B are graphs showing representative graphs of a digital data signal generated by an embodiment of a device according to the teachings herein over a period of 15 microseconds in the time-domain (upper graph) and the frequency domain (lower graph).
Figure 6B:
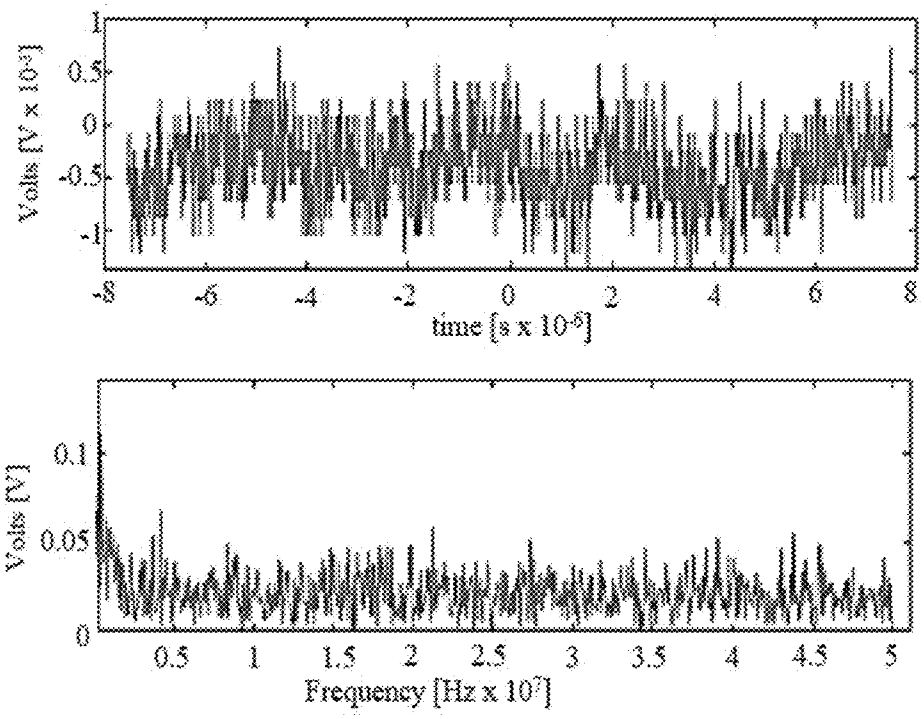

Two representative series (#s 66 and 67) of the 640 series are reproduced in FIGS. 6A and 6B, where the upper graph and lower graph are as described for FIGS. 4A, 4B and 4C.

Discussion of the Results

The experimental results demonstrate that the noise produced by the device is random. This is deduced based on the analysis of the graphs in FIGS. 4A-6B. The graphs in the time domain demonstrate random signal strength across the entire sample. The graphs in the frequency domain demonstrate substantially even spread of electrical power across almost the entire frequency range. Accordingly, a digital voltage signal generated by a device according to the teachings herein constitutes a series of true random numbers.

Three additional observations are also made:

a. The very low frequencies are somewhat more abundant than the higher frequencies.

b. Higher frequency of the noise (higher than $0.5\times10^{7}$ Hz/5 MHz) is uniform and random.

c. The higher the number of samples that are acquired, the more uniform the amplitude through the frequency range.

Without wishing to be held to any one theory, based on these three observations it is hypothesized that:

- the lower frequencies are caused by more energetic collisions in the glow discharge lamp and therefore harm the randomness if included. Accordingly, in some embodiments a device according to the teachings herein preferably includes a high-pass filter; and
- the observed over-abundance of lower frequencies is an artifact of an insufficient number of samples for the Fast-Fourier Transform applied by the Inventors to generate the frequency-domain graphs.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. As used herein, the indefinite articles "a" and "an" mean "at least one" or "one or more" unless the context clearly dictates otherwise.

As used herein, when a numerical value is preceded by the term "about", the term "about" is intended to indicate +/−10%. As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Embodiments of methods and/or devices described herein may involve performing or completing selected tasks manually, automatically, or a combination thereof. Some methods and/or devices described herein are implemented with the use of components that comprise hardware, software, firmware or combinations thereof. In some embodiments, some components are general-purpose components such as general purpose computers, digital processors or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for generating a series of random numbers, comprising:

operating a circuit comprising a low-pressure cold-cathode glow discharge lamp;

obtaining an analog current-noise signal in said circuit as a result of said operating;

using a high-pass current filter to filter out low-frequency components of the analog current-noise signal; and converting the filtered analog current-noise signal to a digital data signal, wherein said digital data signal constitutes a series of random numbers.

2. The method of claim 1, wherein said converting said analog current-noise signal to a digital data signal comprises:

converting said analog current-noise signal to an analog voltage signal that is representative of the variation of the analog current-noise signal; and digitizing said analog voltage signal, thereby generating said digital data signal.

3. The method of claim 2, wherein said converting said analog current-noise signal to an analog voltage signal is performed using a transimpedance unit configured to receive said analog current-noise signal and to generate and output an analog voltage signal that is representative of the variation of the received analog current-noise signal.

4. The method of claim 3, wherein said glow discharge lamp is operated at a voltage of greater than 60 V and said transimpedance unit is operated at a voltage of not more than about 12 V.

5. The method of claim 2, wherein said digitizing is performed with a digitizer that is configured to receive said analog voltage signal and to generate and output a digital data signal that is representative of the variation of said analog current-noise signal.

6. The method of claim 5, wherein said digitizer is selected from the group consisting of an Analog-to-Digital Converter and a comparator.

7. The method of claim 1, wherein said digital data signal has a data rate of not less than 1 Gigasample/s.

8. The method of claim 1, wherein the cold-cathode glow discharge lamp comprises non-coated electrodes.

9. The method of claim 1, wherein the cold-cathode glow discharge lamp is devoid of an ionizing gas.

10. A random number generator circuit (10, 12, 14, 88), comprising:

a. a low-pressure cold-cathode glow discharge lamp (16), having: a first lamp electrode (18), and a second lamp electrode (20);

b. a low noise electrical power supply (44,46);

c. a first line (22) for providing electrical connection between said first lamp electrode (18) and a first electrode of the electrical power supply;

d. a second line (24) for providing electrical connection between said second lamp electrode (20) and a second electrode of an electrical power supply; and e. a high-pass current filter (76) configured to receive from said selected line an analog current-noise signal (28) caused as a result of the operation of said glow discharge lamp (16), and filter out low-frequency components of the analog current-noise signal; and f. electrically connected to a line selected from the group consisting of said first line (22) and said second line (24), a transimpedance unit (26) configured to:

receive from said high-pass current filter, an analog current-noise signal (28) with a reduced intensity of low-frequency components, and to generate and output an analog voltage signal (30) that is representative of the variation of the filtered analog current-noise signal (28).

11. The circuit of claim 10, wherein said power supply is an AC power supply (46) and further including a notch filter to remove the frequency of said AC power supply and harmonics thereof.

12. The circuit of claim 10, wherein said transimpedance unit (26) is connected to said selected line through a third line (54) that is electrically connected to said selected line and to said transimpedance unit (26).

13. The circuit of claim 12, comprising a coupling capacitor, implementing a current filter (56) on said third line (54) configured to allow only the analog current-noise current signal to reach said transimpedance unit (26).

14. The circuit of claim 10, wherein said glow discharge lamp (16) is configured to operate at a voltage of greater than 60 V, said transimpedance unit (26) is configured to operate with a power supply providing power at not more than about 12 V, and the circuit further comprises a current-spike protector comprising two grounded fast-recovery diodes (58*a*, 58*b*).

15. The circuit of claim 10, further comprising a digitizer (32) configured to:

receive an analog voltage signal (30) from said transimpedance unit (26); and to generate and output a digital data signal (34) that is representative of the variation of said received analog current-noise signal (28).

16. The circuit of claim 15, said digitizer (32) comprising a component selected from the group consisting of an Analog-to-Digital Converter (60) and a comparator (62).

17. A Populated Circuit Board (PCB) (78) comprising a random number generator circuit (10, 12, 14, 88) of claim 10.

18. The PCB (78) of claim 17, wherein high-voltage components of said circuit (10, 12, 14, 88) are located on a first high-voltage face (80) of the PCB (78) and low-voltage components of said circuit are located on a second low-voltage face (82) of the PCB (78) different from said high-voltage face (80).

* * * * *